United States Patent [19]

Bayuga

[11] 4,319,943
[45] Mar. 16, 1982

[54] FOLDED BEAD FILLER CONSTRUCTION

[75] Inventor: Douglas A. Bayuga, Wilson, N.C.

[73] Assignee: The Firestone Tire & Rubber Company, Akron, Ohio

[21] Appl. No.: 184,681

[22] Filed: Sep. 8, 1980

[51] Int. Cl.³ .............................................. B29H 17/32
[52] U.S. Cl. .................... 156/136; 156/221; 156/227; 156/398; 156/460; 152/353 R; 152/354 R; 152/362 R
[58] Field of Search ........... 152/353 R, 354 R, 362 R, 152/362 CS; 156/123 R, 131, 132, 135, 136, 398, 400, 460, 196, 216, 221, 227

[56] References Cited

U.S. PATENT DOCUMENTS 2,752,980  7/1956  Riggs .................................... 152/354
3,612,138  10/1971  Ravenhall ....................... 152/362 R
3,941,177  3/1976  Okada et al. ..................... 152/362 R
4,177,852  12/1979  Merli et al. ....................... 152/354 R
4,196,036  4/1980  Allen et al. .......................... 156/422

Primary Examiner—John E. Kittle
Attorney, Agent, or Firm—Ernst H. Ruf

[57] ABSTRACT

The method of shaping and securing an uncured tire bead filler material to a tire bead ring consisting of initially placing a piece of bead filler material over one of the peripheral surfaces of the bead ring; stitching a filler material first portion to this surface; folding, juxtaposing and thereby adhering a part of a filler material second portion over and on at least the filler material first portion; and adjusting the final angular position of the remainder of the filler material relative to the bead ring. Several embodiments of this method are presented.

15 Claims, 12 Drawing Figures

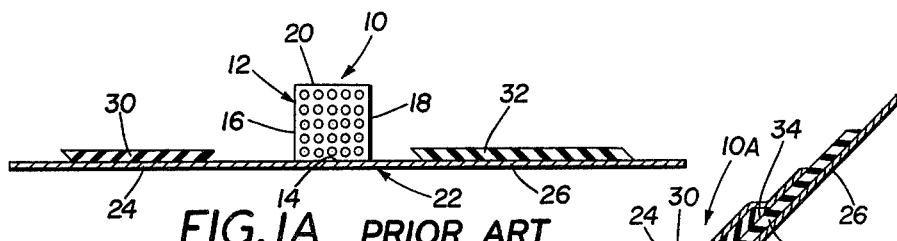
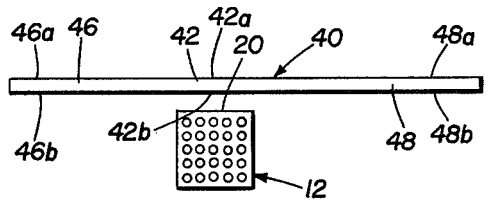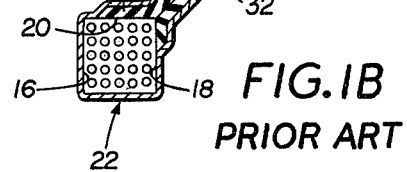
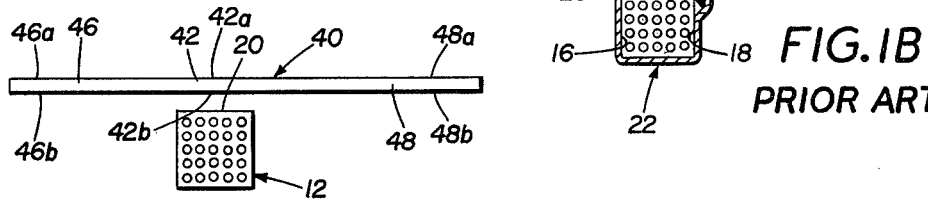
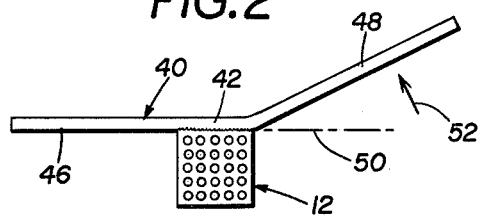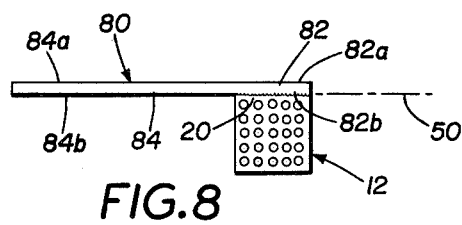
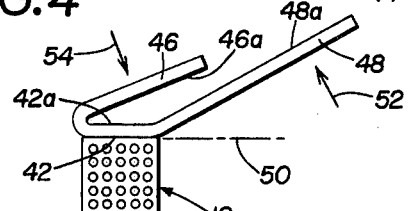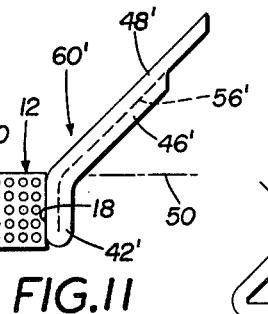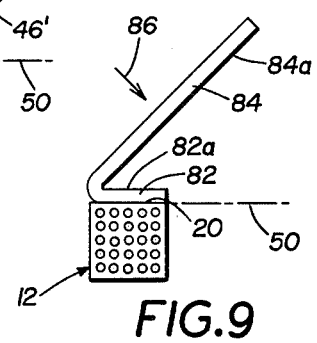
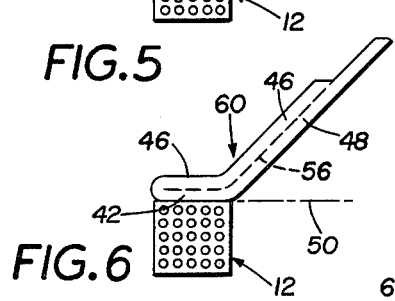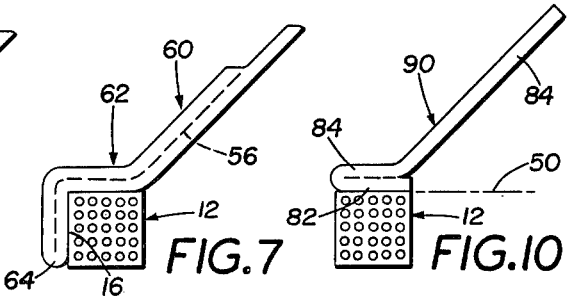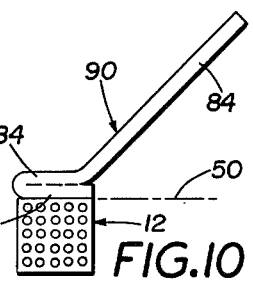

FOLDED BEAD FILLER CONSTRUCTION

TECHNICAL FIELD

The field of art to which this invention pertains is that of a process or method for making a tire bead filler for the bead zone of a vehicle tire, with the filler being disposed in a radially outward position with respect to the bead ring and closely connected thereto.

In the manufacture of pneumatic tires, an inextensible bead ring reinforces the respective tire side openings to render them substantially non-stretchable. In one known assembly, each tire bead is composed of a multiplicity of closely spaced parallel wires that are passed in the same plane through an extruder which places a rubber coating around and between the wires so as to form a flat ribbon. The ribbon is thereafter spirally wound upon itself in a number of convolutions to build up a bead-wire core or bead ring having the desired thickness and tensile strength. As is already known, an annular filler material of a suitable composition is usually placed in the tire bead zone in a radially outward position with respect to the bead-wire core. Generally, the characteristics of the filler compound differ from those of the rubber compound of the sidewalls of the tire. The annular filler material is located in a radially outer position with respect to the bead-wire core and is affixed thereto in order to form an assembly of the filler and the bead-wire core. This assembly, after having a reinforce strip wrapped around the tire bead, in order to facilitate its application to the respective sides of the tire carcass, is inserted in the tire bead during the tire-building process. The material of the annular element is prepared from a compound of rather hard rubber which is usually different from the rubber of the tire sidewalls, the purpose being to fill up the zone outside the bead-wire core to avoid formation of air blisters in the carcass cord-layer turnups around the core, as well as to impact a prefixed rigidity or stiffness to the bead.

BACKGROUND ART

In one known prior art assembly method, a generally cylindrical piece of reinforce material, having two axially spaced filler material portions adhered thereto, is attached to the inner peripheral surface of a bead ring and thereafter wrapped or folded around the bead ring so that at least portions of the filler material adhere to adjacent faces of the bead ring, with juxtaposed portions thereof also adhering to each other and projecting angularly in a radially outward direction from the bead ring. This type of prior art construction will be discussed in more detail hereinafter.

Another prior art construction is set forth in U.S. Pat. No. 2,752,980 wherein flexible wedge-like, generally extruded, rubber strips are attached to the bead rings. When the wedge-like strips are in place, the ends of the various plies are turned up around the bead cores in a manner well known in the art. FIG. 5 of this reference also shows that rubber strips of sheet form are folded upon themselves around the bead cores to form wedge-like structures of substantially the same configuration as the extruded triangular-like strips that are generally used.

In yet another process, shown in FIGS. 3 to 8 of U.S. Pat. No. 4,196,036, a filler gum having a circular cross section is applied to the outer peripheral surface of a bead ring. The filler gum is thereafter stitched to the bead ring and partially shaped by a first stitching roller and, after being enveloped or wrapped by a reinforce or filler strip cloth, is further deformed into a generally triangular shape via second and third stitching rollers.

DISCLOSURE OF THE INVENTION

The present invention provides an improvement over the previously-discussed prior art processes by essentially permitting the manufacture of a bead filler by the use of a piece of rubber that is folded back upon itself after being stitched, in its uncured state, to at least either the top and/or one of the sides of the bead ring.

In accordance with the present invention, a process is provided for shaping and securing an uncured tire bead filler to a tire bead ring that comprises placing a piece of bead filler material completely over either the outer peripheral surface or the annular side surface of the bead ring so that a first portion of the filler material covers at least one of these surfaces and that a second portion of the filler material, which exceeds the width of this surface, extends transversely of the bead ring in at least one direction; stitching the first portion to this surface; folding, juxtaposing and thereby adhering at least a part of the filler material second portion over and on at least the first portion of the filler material; and adjusting the final angular position of the remainder of the filler material second portion relative to the bead ring.

The method of this invention can be practiced by only slightly modifying a well known prior art bead assembly machine; utilizes less expensive material; and may eliminate the need for reinforce materials. The bead assemblies produced by the use of this process are also smaller, thinner and lighter in weight, all of which are beneficial in terms of energy consumption.

BRIEF DESCRIPTION OF THE DRAWINGS

FIG. 1A is a fragmentary sectional view of a prior art bead filler and reinforce construction before its assembly to a bead bundle.

FIG. 1B is a fragmentary sectional view of the prior art bead filler and reinforce construction after its assembly to the head bundle.

FIG. 2 is a fragmentary sectional view of a bead bundle about to have a flat piece of filler material placed thereupon.

FIG. 3 is a sectional view, similar to that of FIG. 2, showing that the flat piece of filler material has been placed upon and stitched onto the top surface of the bead bundle and that one wing of the filler material is being angularly displaced.

FIG. 4 is a sectional view, similar to that of FIG. 3, showing that the other wing of the filler material is being rotationally displaced.

FIG. 5 is a sectional view, similar to that of FIG. 4, showing that the other wing has been further angularly displaced and has assumed a position that is generally parallel with the one wing.

FIG. 6, which is a sectional view similar to that of FIG. 5, shows the other wing being folded over and adhered to the portion of the filler material that was previously stitched to the bead bundle, with the remainder of the other wing being folded upon and adhering to the one wing portion.

FIG. 7 is a fragmentary sectional view of another embodiment of this invention.

FIG. 8 is a fragmentary sectional view of a further embodiment of this invention wherein a flat piece of filler material having one margin thereof stitched upon and essentially completely covering the top surface of a bead bundle and having a wing portion transversely extending relative to the bead bundle.

FIG. 9 is a sectional view of a structure shown in FIG. 8 after the wing portion thereof has been substantially angularly displaced in a manner so as to approach the position of being folded onto that portion of the filler material overlying the bead bundle.

FIG. 10 is a sectional view, similar to that of FIG. 9, showing a further angular displacement of the wing portion of FIG. 9 wherein a part of said wing portion is juxtaposed on that portion of the filler material overlying the bead bundle.

FIG. 11 is a fragmentary sectional view of yet an additional embodiment of this invention.

BEST MODE FOR CARRYING OUT THE INVENTION

Referring now to FIG. 1A, which is a fragmentary sectional view of a prior art bead subassembly 10 wherein an annular bead ring or bundle 12 of any desired construction, cross section and composition, has a generally cylindrical piece of any desired reinforce material 22 stitched or attached to the inner peripheral surface 14 of bead bundle 12. Reinforce material wings 24 and 26 extend axially beyond bead bundle surface 14 and have located on the top surfaces thereof generally cylindrical bead filler portions 30 and 32 respectively, with these filler portions being axially spaced from bead bundle annular side surfaces 16 and 18 respectively. In this particular construction, the top or outer peripheral surface 20 of bead bundle 12 is generally parallel with filler portions 30 and 32.

As best shown in FIG. 1B, which is a fragmentary sectional view of prior art bead assembly 10A, material reinforce wing portion 24 is folded clockwise around bead bundle surfaces 16 and 20 in a manner so that an annular piece of filler portion 30 is interposed between wing 24 and bead bundle outer peripheral surface 20. In a similar manner, reinforce material wing portion 22 is folded counterclockwise around bead bundle side surface 18 so that a generally peripheral piece of filler portion 32 is interposed between wing 26 and a portion of bead bundle side surface 18. The remainders of filler portions 30 and 32 have their inner peripheral surfaces juxtaposed and adhered to each other and in this particular instance project at an angle of about 45° relative to an imaginary plane coincident with bead bundle outer peripheral surface 20. The angulation of the combination or assembly 34 of filler portions 30 and 32 may, however, range from 0° to 90° and may be right-handed (as shown) or left-handed, i.e., allochiral or mirror image depending on whether the bead is used with the inner or outer sidewall of the tire. This type of construction is well known in the art and has been successfully used for an extended period of time. It will also be noted that filler assembly 34 is essentially surrounded by reinforce material 22. After curing or vulcanization of the tire containing bead filler assembly 10A, the adjoining surfaces of filler portions 30 and 32 are totally vulcanized together and thus form unitary filler assembly 34.

Turning now to one of the improved folded bead filler constructions of this invention, for ease of understanding and description, bead bundle 12 may be the same as that previously described with reference to prior art FIGS. 1A and 1B. FIG. 2 shows a piece of uncured or green filler material 40, generally cylindrical in shape, about to be placed on bead bundle outer peripheral surface 20. Filler material 40 is normally of a rubber composition; may be extruded or tubed; and may have a contoured shape if so desired. Filler material 40 can be described as having a mid-portion 42 that has an axial extent generally coincident with that of bead bundle outer peripheral surface 20. Filler mid-portion 42 also has outer and inner peripheral surfaces 42a and 42b respectively. Filler material 40 further includes first and second wing portions 46 and 48 which extend from the opposite ends of filler material mid-portion 42 respectively. Similar to mid-portion 42, wing portions 46 and 48 have outer peripheral surfaces 46a and 48a as well as inner peripheral surfaces 46b and 48b respectively.

Turning now to FIG. 3, it will be seen that filler material 40 has been placed on bead bundle 12 by stitching filler material mid-portion 42, more specifically mid-portion inner peripheral surface 42b to bead bundle outer peripheral surface 20. At the same time, force or pressure, represented by arrow 52, is applied to second wing portion 48 causing it to be counterclockwise or positively angularly displaced relative to an imaginary plane 50 coincident with bead bundle outer peripheral surface 20.

Continuing now to FIG. 4, it will be noted that further force or pressure, represented by arrow 54, is exerted against first wing portion 46 thereby causing it to be angularly displaced in the clockwise or negative direction relative to plane 50.

Turning now to FIG. 5, it will be noted that the continuing application of force to first wing portion 46 will continue its angular displacement in the counterclockwise direction and will, after passing through a vertical position, start to fold over filler material mid-portion 42 and cause mid-portion outer peripheral surface 46a to adhere to mid-portion outer peripheral surface 42a and a portion of second wing outer peripheral surface 48a in the manner shown in FIG. 6. It will be noted that the folding of filler material 40, in the manner previously described, results in folded bead filler structure 60 shown in FIG. 6 which essentially consists of a double fold of material 40, consisting of part of wing portion 46 folded upon and juxtaposed to filler mid-portion 42, with the remainder of wing portion 46 being folded upon and juxtaposed to wing portion 48. As is the case with prior art bead filler assembly 34, the angulation of the juxtaposed parts of wing portions 46 and 48, relative to horizontal plane 50 can vary as desired. If desired, the transverse extent of wing portion 46 need be no greater than the width of bead bundle 12 so that no part of wing portion 46 is folded upon wing portion 48. Subsequent curing or vulcanization will substantially totally eliminate the boundary between surfaces 42a, 46a and 48a which is represented by broken line 56 in FIG. 6.

Turning now to FIG. 7, which is a fragmentary sectional view of another embodiment of this invention, a folded bead filler 62, similar to previously-described folded bead filler 60, also utilizes an additional folded filler material portion 64 which consists of two layers of wing portion 46 that are basically adhered to bead bundle side surface 16 and which smoothly merge into the remainder of folded bead filler 62.

Turning now to FIG. 8, there is shown a fragmentary sectional view of a bead bundle or ring 12 having stitched thereupon an end portion 82 of a piece of filler material 80 which may be of the same general composition and shape as previously discussed filler material 40.

Filler material end portion 82 has outer and inner peripheral surfaces 82a and 82b respectively with the axial extent of end portion 82a coinciding with the axial extent of bead bundle outer peripheral surface 20. The remainder of filler material 80 takes the form of a single wing portion 84 that extends axially or transversely from one end of end portion 82. Wing portion 84 has outer and inner peripheral surfaces 84a and 84b respectively. As shown in FIG. 8, end portion inner peripheral surface 82b has been stitched onto bead bundle outer peripheral surface 20.

Continuing now to FIG. 9, it will be noted that the application of a force or pressure, represented by arrow 86, causes wing 84 to be angularly displaced in the negative or clockwise direction relative to imaginary plane 50 (coincident with surface 20) in a manner so as to start to juxtapose a part of wing portion 84 on end portion 82 so that end portion outer peripheral surface 82a is stitched to a corresponding part of wing portion outer peripheral surface 84a and results in folded bead filler construction 90 shown in FIG. 10. It will be noted that folded bead filler 90 basically has two layers of filler material 80 juxtaposed relative to bead bundle top surface 20 and that the remaining free surface of wing 84 is but a single layer of filler material 80. The angular final position of the free end of wing portion 84 may again vary as desired. If necessary, folded bead filler 90 can be modified by the addition of a folded filler material portion adhering to bead filler annular side surface 16 (or 18 if of mirror image construction) in a manner similar to folded bead filler material portions 64 shown in FIG. 7.

Turning now to FIG. 11, which is a fragmentary sectional view of yet an additional embodiment of this invention, a folded bead filler 60' (substantially similar to bead filler 60 of FIG. 6 and thus denominated with like but prime numerals) is, in this instance, secured to and shaped relative to bead bundle annular sidewall surface 18 rather than bead bundle outer peripheral surface 20. The process for securing and shaping folded bead filler 60' is substantially the same as that for filler 60 except that the process takes place relative to an annular sidewall surface rather than the outer peripheral surface. If so desired, folded bead filler 60' could be replaced with folded bead filler 90 as long as the latter is secured and shaped relative to a bead bundle annular sidewall surface.

The turning, folding, stitching and adjusting of the tire bead fillers of the present invention can be done manually or with machinery well known in the art. An example of such a machine is a No. 612 bead assembly machine manufactured by the Utility Manufacturing Company of Kenosha, Wis. In addition, if considered necessary or desirable, any of the previously-noted folded bead filler constructions could be further wrapped with a rubber-coated fabric reinforce material similar to that shown in FIG. 1B, for example.

From the foregoing, it is believed that those familiar with the art will recognize and appreciate the novel concepts and features of the present invention. Obviously, while the invention has been described in relation to but a limited number of embodiments, numerous variations, changes and substitutions of equivalents will present themselves to persons skilled in the art and may be made without necessarily departing from the scope and principles of this invention, with the scope thereof being determined solely by reference to the claims appended hereto.

I claim:

1. The method of shaping and securing an uncured tire bead filler material to a tire bead ring, said method comprising:
   (a) placing a piece of bead filler material completely over one of the outer peripheral and annular side surfaces of said bead ring, so that a first portion of said filler material covers said one surface and that a second portion of said filler material, exceeding the width of said one surface, extends transversely thereof in at least one direction;
   (b) stitching said first portion of said filler material to said one surface;
   (c) folding, juxtaposing and thereby adhering at least a part of said second portion of said filler material over and on at least said first portion of said filler material; and
   (d) adjusting the final angular position of the remainder of said at least a part of said second portion of said filler material relative to said bead ring.

2. The method of claim 1 wherein said filler material second portion extends in but one transverse direction.

3. The method of claim 1 wherein said filler material second portion extends in both transverse directions.

4. The method of claims 1 or 3 including folding and juxtaposing the remainder of said at least part of said filler material second portion on another part of said filler material second portion prior to adjusting the final angular position of the remainder of said filler material second portion.

5. The method of claim 1 wherein the final angular position of the remainder of said filler second portion is measured relative to a plane coincident with the outer peripheral surface of said bead ring and ranges from about 0° to about 135°.

6. The method of claims 2 or 3 wherein said one surface is the outer peripheral surface of said bead ring.

7. The method of claims 2 or 3 wherein said one surface is an annular side surface of said bead ring.

8. The method of claims 2 or 3 further including placing and stitching at least a part of said second portion of said filler material on another of the outer peripheral and annular side surfaces of said bead ring prior to step (c) of claim 1, with said step (c) further including folding, juxtaposing and thereby adhering at least a further part of said second portion of said filler material over said at least a part of said second portion of said filler material.

9. The method of shaping and securing an uncured tire bead filler material to a tire bead ring, said method comprising:
   (a) placing a piece of bead filler material completely around the outer peripheral surface of said bead ring so that a first portion of said filler material covers said peripheral surface and that a second portion of said filler material, substantially exceeding the width of said bead ring, extends transversely thereof in one direction;
   (b) stitching and thereby adhering said first portion of said filler material to said peripheral surface;
   (c) folding, juxtaposing and thereby adhering said second portion of said filler material relative to said filler material first portion; and
   (d) adjusting the final angular position of the remainder of said filler material second portion relative to said bead bundle.

10. The method of shaping and securing an uncured tire bead filler to a tire bead ring, said method comprising:
  (a) placing a piece of bead filler material completely around the outer peripheral surface of said bead ring, so that a first portion of said filler material covers said peripheral surface, a second portion of said filler material extends transversely of said bead bundle in a first direction and a third portion of said filler material extends transversely of said bead bundle in a second direction, at least one of said filler material second and third portions exceeding the width of said bead bundle;
  (b) stitching and thereby adhering said filler material first portion to said peripheral surface;
  (c) angularly displacing one of said filler material second and third portions in one direction;
  (d) folding, juxtaposing and thereby securing the other of said filler material second and third portions relative to said filler material first portion in a direction opposite to said one direction; and
  (e) adjusting the final angular position of the one of said filler material second and third portions relative to said bead ring.

11. The method of claim 10 wherein further including the step of further folding, juxtaposing and adhering the remainder of the other of said filler material second and third portions relative to the one of said filler material second and third portions prior to step (e) of claim 10.

12. The method of claim 11 wherein the remainder of the other of said filler material second and third portions and the one of said filler materials second and third portions have dissimilar transverse extents.

13. A process for preparing an assembly of a tire bead ring and an annular filler material for the bead zone of a vehicle tire comprising:
  (a) disposing a piece of uncured tire bead filler material completely over one of the outer peripheral surfaces and annular side surfaces of said bead ring so that a first portion thereof covers said one surface and that a second portion thereof, exceeding the width of said one of said surfaces, extends transversely thereof;
  (b) stitching said filler material first portion to said one surface;
  (c) folding, juxtaposing and adhering at least a part of said filler material second portion over and on at least said filler material first portion; and
  (d) adjusting the final angular position of the remainder of said filler material second portion relative to said bead ring.

14. A process according to claim 13 wherein said one of said surfaces is the outer peripheral surface of said bead ring.

15. The process according to claim 13 wherein said one of said surfaces is an annular side surface of said bead ring.

* * * * *